United States Patent [19]
Imai et al.

[11] Patent Number: 5,462,340
[45] Date of Patent: Oct. 31, 1995

[54] PRELOADER FOR A WEBBING RETRACTOR

[75] Inventors: Keisuke Imai; Naohiro Tsukiyama, both of Aichi, Japan

[73] Assignee: Kabushiki Kaisha Tokai-Rika-Denki-Seisakusho, Aichi, Japan

[21] Appl. No.: 133,365

[22] Filed: Oct. 8, 1993

[30] Foreign Application Priority Data

Oct. 12, 1992 [JP] Japan .................. 4-070946 U

[51] Int. Cl.⁶ .................................................. A62B 35/00
[52] U.S. Cl. .................................................. 297/478; 297/475
[58] Field of Search ................................ 297/464, 468, 297/474, 475, 476, 478, 479, 480; 280/806; 242/384.7, 385.4

[56] References Cited

U.S. PATENT DOCUMENTS

| | | | |
|---|---|---|---|
| 4,327,882 | 5/1982 | Frankila et al. | 242/384.7 X |
| 4,428,545 | 1/1984 | Naitoh | 242/384.7 X |
| 4,958,854 | 9/1990 | Haland | 297/480 X |
| 5,145,209 | 9/1992 | Lenzen | 297/480 X |
| 5,163,708 | 11/1992 | Kotama | 297/480 X |
| 5,337,970 | 8/1994 | Imai et al. | 280/806 X |
| 5,364,168 | 11/1994 | Nishizawa et al. | 297/476 |

*Primary Examiner*—Kenneth J. Dorner
*Assistant Examiner*—Milton Nelson, Jr.
*Attorney, Agent, or Firm*—Sixbey, Friedman, Leedom & Ferguson

[57] ABSTRACT

A lever is provided for switching from a state in which a preloader for rapidly rotating a webbing take-up shaft in a webbing winding direction in an emergency of a vehicle is non-operated to a state in which the preloader is operated. Before a retractor is mounted to the vehicle, the preloader is made non-operative so that an undesired operation may be avoided. The lever interlocks with a lock device for preventing the webbing take-up shaft from being rotated in a webbing pulling-out direction during acceleration of the vehicle. When the preloader is in a non-operative state, the lock device provides a locked state in which a webbing cannot be pulled out from the webbing take-up shaft. Therefore, in order to fasten the webbing to an occupant, the lever must be actuated to enable the pulling out of the webbing, i.e., to enable the lock device to operate and to enable the preloader to operate. After the retractor has been mounted to the vehicle, the preloader is released from the non-operating state.

20 Claims, 7 Drawing Sheets

5,462,340

1

PRELOADER FOR A WEBBING RETRACTOR

BACKGROUND OF THE INVENTION

1. Field of the Invention

The present invention relates to a preloader used in a webbing retractor and capable of rapidly and instantaneously rotating a webbing take-up shaft in a webbing winding direction when a vehicle suddenly decelerates.

2. Description of the Related Art

There has heretofore been used a webbing retractor having a preloader capable of rapidly and instantaneously rotating a webbing take-up shaft in a webbing winding direction when a vehicle suddenly decelerates. This type of preloader normally has a control device or a safety device, which activates the preloader only when necessary. When the webbing retractor is mounted to and removed from the vehicle, the safety device enables the preloader to be placed in a non-actuatable state. When the webbing retractor is completely mounted to the vehicle, the preloader is released from a state in which actuation thereof is not possible (non-actuatable state) so as to be brought into a state in which actuation thereof is possible (actuatable state) (see Japanese Patent Application Laid-Open No. 64-85855 as an example). The structure of this disclosure will be described below.

In a webbing retractor 100, a preloader 102 is disposed on one leg plate side of the webbing retractor 100 as shown in FIG. 6. A set lever 106, which forms a portion of a safety device, is rotatably mounted to a sensor 104 of the preloader 102 as illustrated in FIG. 7. When the set lever 106 is rotated from the position shown in FIG. 6 to a vertical position, the preloader 102 is brought into a non-actuatable state so that a webbing is not pulled out when an acceleration is applied. Further, an auxiliary pin 108 is attached to the sensor 104 and is normally urged in a direction of moving away from the webbing 112 by a compression coil spring 110. Moreover, an engaging member 114 is disposed at a large-diameter tip portion 108A side of the auxiliary pin 108. The webbing 112 is interposed between the engaging member 114 and the auxiliary pin 108 according to the extension of the auxiliary pin 108. In accordance with the above structure, when the set lever 106 is brought into the vertical state, the preloader 102 is brought into the non-actuatable state and the auxiliary pin 108 extends out such that the webbing 112 is interposed between the engaging member 114 and the auxiliary pin 108. When the set lever 106 is rotated substantially 90° so as to reach the inclined position shown in FIG. 6, the preloader 102 is brought into the actuatable state again, and the auxiliary pin 108 is moved away from the webbing 112 by the urging force of the compression coil spring 110. Thus, in the former, i.e., the non-actuatable, state of the preloader 102, the safety device is operated, whereas in the latter, i.e., the actuatable, state of the preloader 102, the safety device is in an inoperative state. Unless the safety device is released from operation, i.e., the preloader 102 is brought into the actuatable state, a user cannot wear the webbing 112.

However, in the structure disclosed in the above publication, even if the safety device is brought into the operating state and the webbing 112 is interposed between the auxiliary pin 108 and the engaging member 114, there is the concern that the webbing 112 may be pulled out when the user forcibly pulls out the webbing 112 without noticing that the safety device is in operation. In this case, a drawback arises in that since the safety device is operated, the assembling of a seat belt system into a vehicle body is completed in a state in which the sensor 104 has been brought into the non-operating state.

SUMMARY OF THE INVENTION

With the foregoing in view, it is an object of the present invention to provide a preloader used in a webbing retractor, which is capable of reliably preventing a webbing from being pulled out when the preloader is in a non-operative state.

The present invention is applied to a webbing retractor provided with a take-up shaft for winding an occupant-restraining webbing thereon and a locking means for preventing the take-up shaft from being rotated in a webbing pulling-out direction in an emergency of a vehicle. When the vehicle rapidly decelerates, the take-up shaft is abruptly and instantaneously rotated in a webbing winding direction by a load mechanism so as to tightly apply the webbing to an occupant. Even if a deceleration of a predetermined value, i.e., a negative acceleration, is exerted on the load mechanism, the load mechanism is in a non-operating state. Further, even if an impact is exerted on the load mechanism, the load mechanism is not activated unnecessarily before the mounting of the load mechanism to the vehicle. When the load mechanism is in the non-operating state, the locking means is brought into a locked state to prevent the take-up shaft from being rotated in the webbing pulling-out direction. Therefore, an operator who assembles the vehicle and an occupant can recognize that the load mechanism is in the non-operative state. Thus, since the load mechanism is changed from the non-operative state to an operative state, the load mechanism is reliably actuated due to acceleration of the vehicle when the webbing has been applied to the occupant.

DETAILED DESCRIPTION OF THE PREFERRED EMBODIMENT

A webbing retractor 10 according to one embodiment of the present invention will hereinafter be described in detail with reference to FIGS. 1 through 5.

Figure 1:
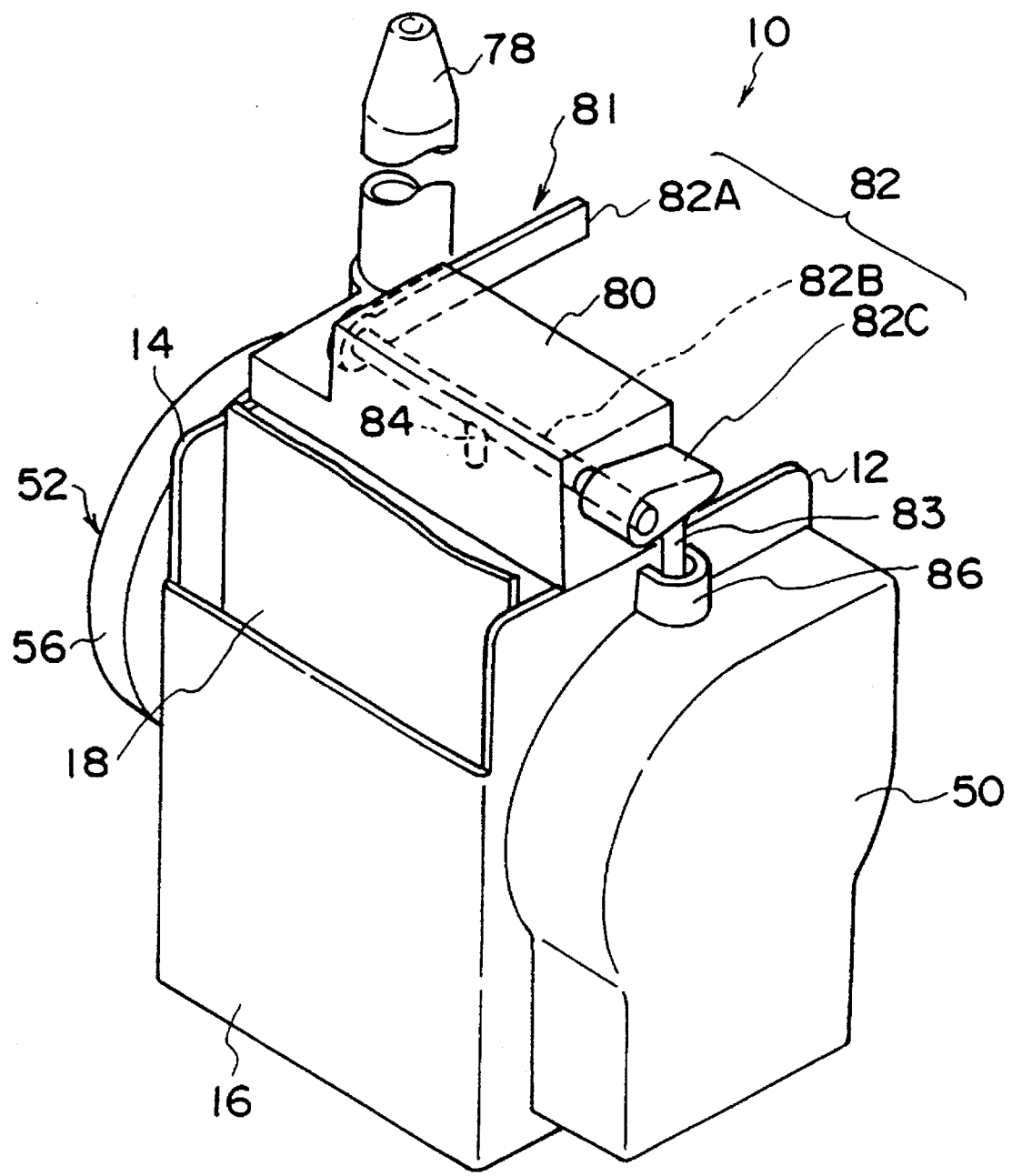
FIG. 1 is a perspective view showing a webbing retractor to which the present invention is applied.

As shown in FIG. 1, the webbing retractor 10 has a frame 16 having a pair of leg plates 12 and 14 disposed parallel to each other. A take-up shaft 20 for winding an occupant-restraining webbing 18 thereon in layer form is supported by the pair of leg plates 12 and 14.

Figure 2:
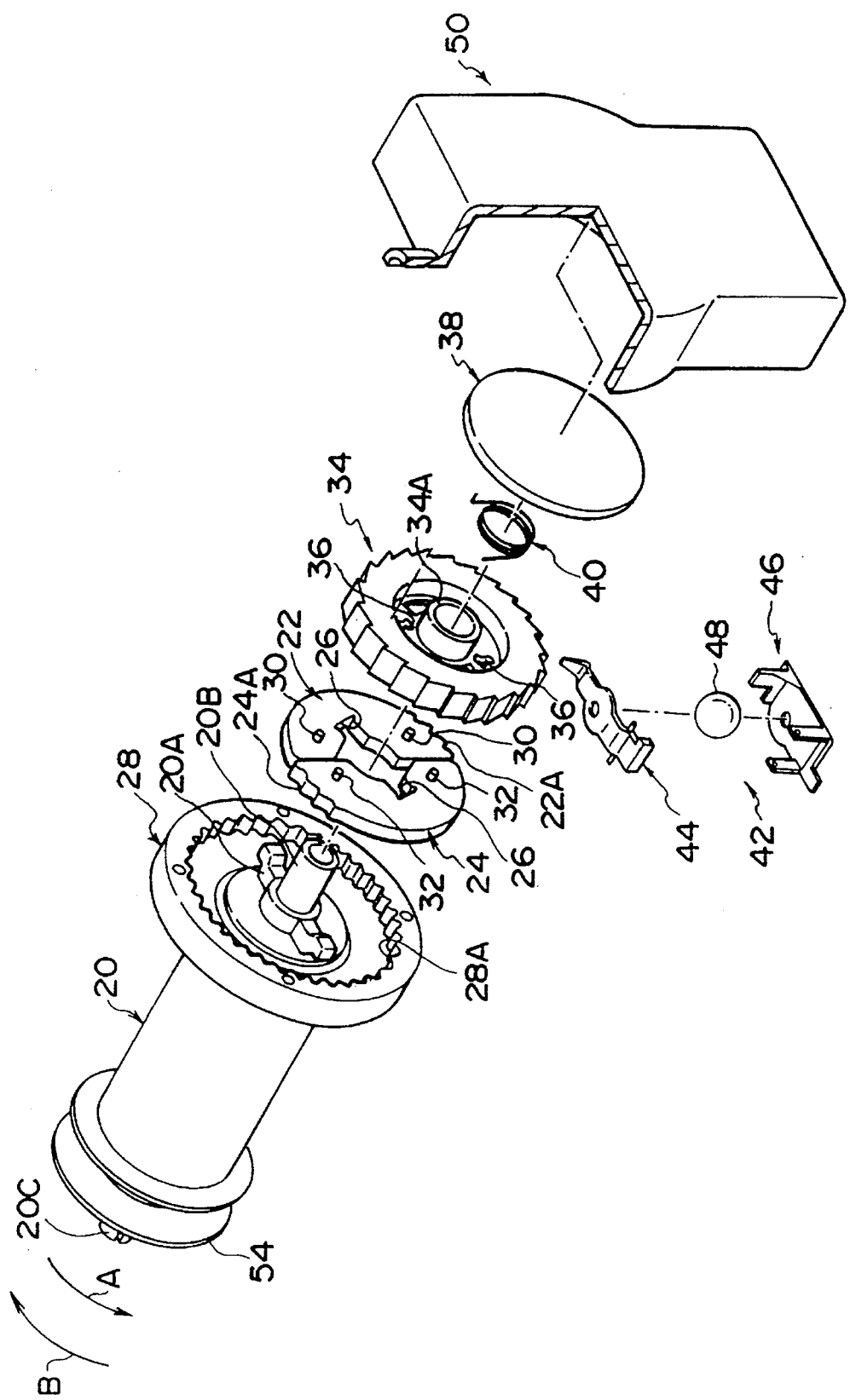
FIG. 2 is an exploded perspective view showing a lock mechanism of the webbing retractor shown in FIG. 1.

As shown in FIG. 2, one of the ends of the take-up shaft 20 protrudes outwardly from the leg plate 12. A yoked portion 20A is mounted on the protruding one end. A pair of lock plates 22 and 24, each of which is shaped substantially in the form of a semicircle, is disposed around the yoked portion 20A. A substantially U-shaped cut-away recess 26 is formed in a central portion of each of the lock plates 22 and 24. Further, the yoked portion 20A is positioned within the cut-away recesses 26.

The lock plates 22 and 24 respectively have pawls 22A and 24A formed in ones of ends thereof. Further, the pawls 22A and 24A are disposed so as to oppose lock teeth 28A of a disc-shaped internal gear wheel 28 fixed onto the outer side surface of the leg plate 12.

Further, pairs of pins 30 and 32 project from the lock plates 22 and 24 respectively. The pairs of pins 30 and 32 are inserted into corresponding elongated holes 36 defined in a lock wheel 34. The lock wheel 34 can be rotated relative to the take-up shaft 20 such that a boss 34A formed at the axial central portion of the lock wheel 34 is supported on the outer peripheral surface of a small-diameter shaft 20B extending in the axial direction of the take-up shaft 20 from the axial central portion of the take-up shaft 20.

A rotor 38, which is made of a resin and shaped in the form of a disc, is disposed on the lock wheel 34 at a side opposite to the leg plate 12 side. A boss (not shown) extending toward the leg plate 12 projects from the axial central portion of the rotor 38 and is inserted into and fixed to the small-diameter shaft 20B of the take-up shaft 20. Thus, when the take-up shaft 20 is rotated, the rotor 38 is also rotated integrally with the take-up shaft 20.

A torsion coil spring 40 is interposed between the lock wheel 34 and the rotor 38. The coil portion of the torsion coil spring 40 is externally fitted on the boss 34A of the lock wheel 34. One end of the torsion coil spring 40 is maintained in engagement with the lock wheel 34, whereas the other end of the torsion coil spring 40 is maintained in engagement with the rotor 38. Thus, the torsion coil spring 40 urges the lock wheel 34 to rotate in a webbing pulling-out direction (i.e., in the direction indicated by arrow B in FIG. 2). As a result, the lock wheel 34 is actuated in response to the urging force of the torsion coil spring 40 so that the pins 30 and 32 of the lock plates 22 and 24 are respectively accommodated within the elongated holes 36 and the pawls 22A and 24A are separated from the lock teeth 28A of the internal gear wheel 28.

An acceleration sensor 42 is disposed at the side below the lock wheel 34. The acceleration sensor 42 comprises a pawl lever 44 disposed in an opposing relationship to the teeth of the lock wheel 34, a sensor plate 46 which supports a base end portion of the pawl lever 44 and is fixed to the leg plate 12, and a ball 48 placed on a central concave portion of the sensor plate 46.

The parts referred to above are accommodated within a sensor cover 50 disposed at an outerside of the leg plate 12.

In the above-described lock mechanism, when a vehicle suddenly decelerates, the ball 48 rolls at the central concave portion of the sensor plate 46 due to the inertial force produced at the time of deceleration so as to push up the pawl lever 44 to thereby bring a tip engagement portion of the pawl lever 44 into engagement with a tooth of the lock wheel 34. When the tip engagement portion of the pawl lever 44 is held in engagement with a tooth of the lock wheel 34, the lock wheel 34 is prevented from being rotated in the webbing pulling-out direction, so that the lock wheel 34 is rotated relative to the take-up shaft 20. Thus, the pins 30 and 32 of the pair of lock plates 22 and 24 are guided into the corresponding elongated holes 36 of the lock wheel 34 and are moved relative to the elongated holes 36, so that the pawls 22A and 24A engage with the lock teeth 28A of the internal gear wheel 28.

Figure 3:
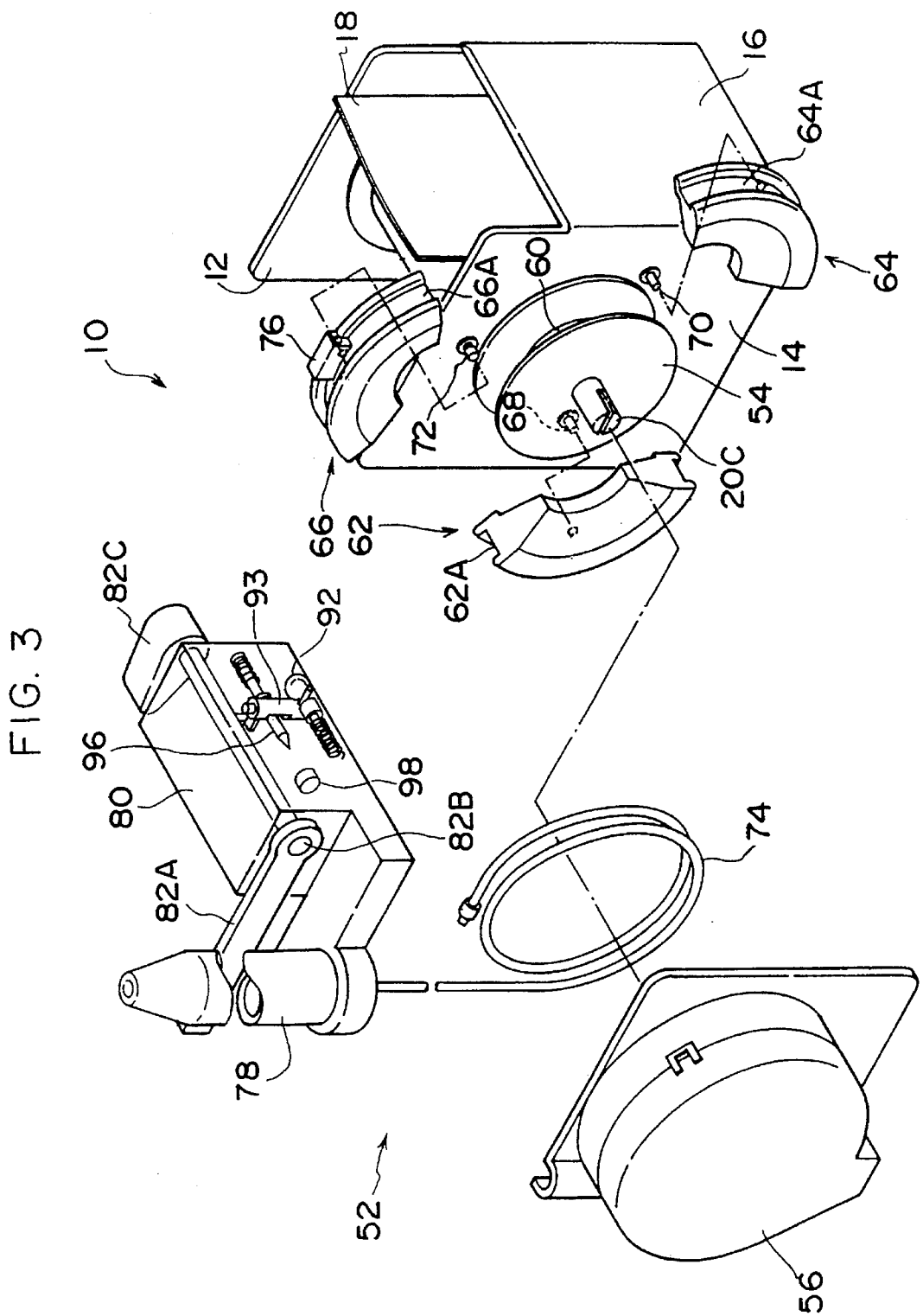
FIG. 3 is an exploded perspective view showing a preload mechanism of the webbing retractor shown in FIG. 1.

On the other hand, parts other than a sensor for a preloader 52 are disposed at the other leg plate 14 side of the webbing retractor 10. As shown in FIG. 3, a rotating drum 54 having a diameter larger than that of the take-up shaft 20 is coaxially formed integrally with the take-up shaft 20 at the other end of the take-up shaft 20. Further, a small-diameter shaft 20C projects from the axial central portion of the rotating drum 54 and is held in engagement with an internal end of a spiral spring (not shown) accommodated within a spring case 56. An external end of the spiral spring engages with an inner wall of the spring case 56. Accordingly, the spiral spring urges the take-up shaft 20 to rotate in a webbing winding direction (i.e., in the direction indicated by arrow A in FIG. 2).

A ring groove 60 is defined in the outer periphery of the rotating drum 54 and accommodates wedge type members 62, 64 and 66 obtained by substantially dividing a ring-shaped member into three parts in the circumferential direction. The wedge type members 62 and 64 are supported by shear pins 68 and 70 provided upright from the leg plate 14. The shear pins 68 and 70 are set to the same shear strength. Further, the wedge type member 66 is supported by a shear pin 72 provided upright from the leg plate 14. The shear pin 72 is set to a shear strength larger than that of each of the shear pins 68 and 70. When the wedge type members 62, 64 and 66 are supported by the shear pins 68, 70 and 72 respectively, the wedge type members 62, 64 and 66 are held in a state of noncontact with the bottom surface of the ring groove 60 of the rotating drum 54. Thus, resistance of the bottom surface of the ring groove 60 to the rotation of the take-up shaft 20 is not normally generated.

A wire 74 is wound into outer peripheral grooves 62A, 64A and 66A of the wedge type members 62, 64 and 66 with some play. One end of the wire 74 is held in engagement with a block 76 fixed to a portion of the peripheral surface of the wedge type member 66. The other end of the wire 74 is coupled to a piston (not shown) tightly accommodated within a cylinder 78. A sensor holder 80 shaped in the form of a rectangular parallelopiped is formed integrally with a base end portion of the cylinder 78. Accommodated within the sensor holder 80 are a mechanical ignition-type sensor for sensing a state of a sudden deceleration of the vehicle, a detonator ignited by the operation of the sensor, a booster which combusts due to the ignition of the detonator, gas generating materials, etc.

Figure 4:
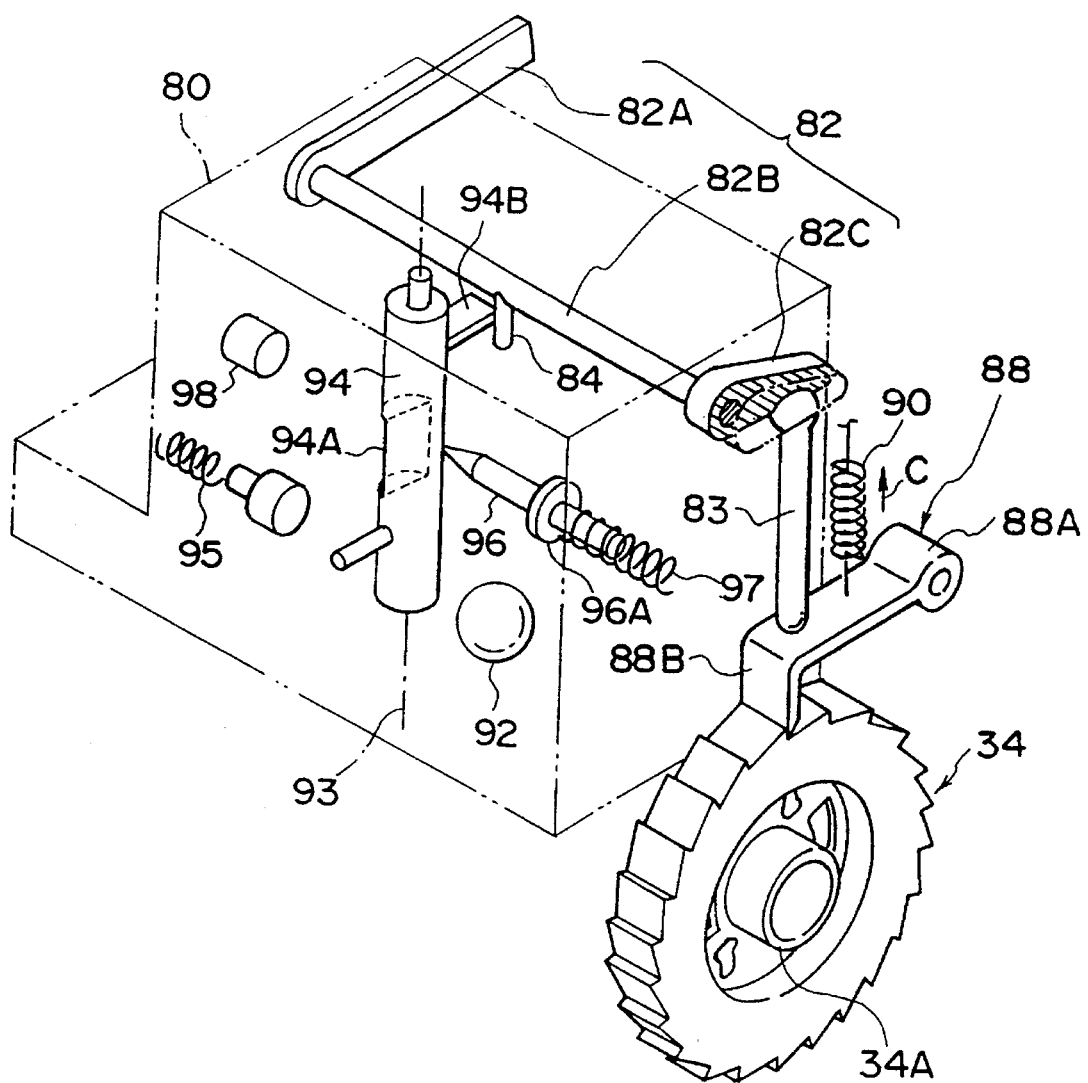
FIG. 4 is an exploded perspective view showing the preload mechanism of FIG. 1 set in a non-actuatable state by a preload control mechanism thereof.
Figure 5:
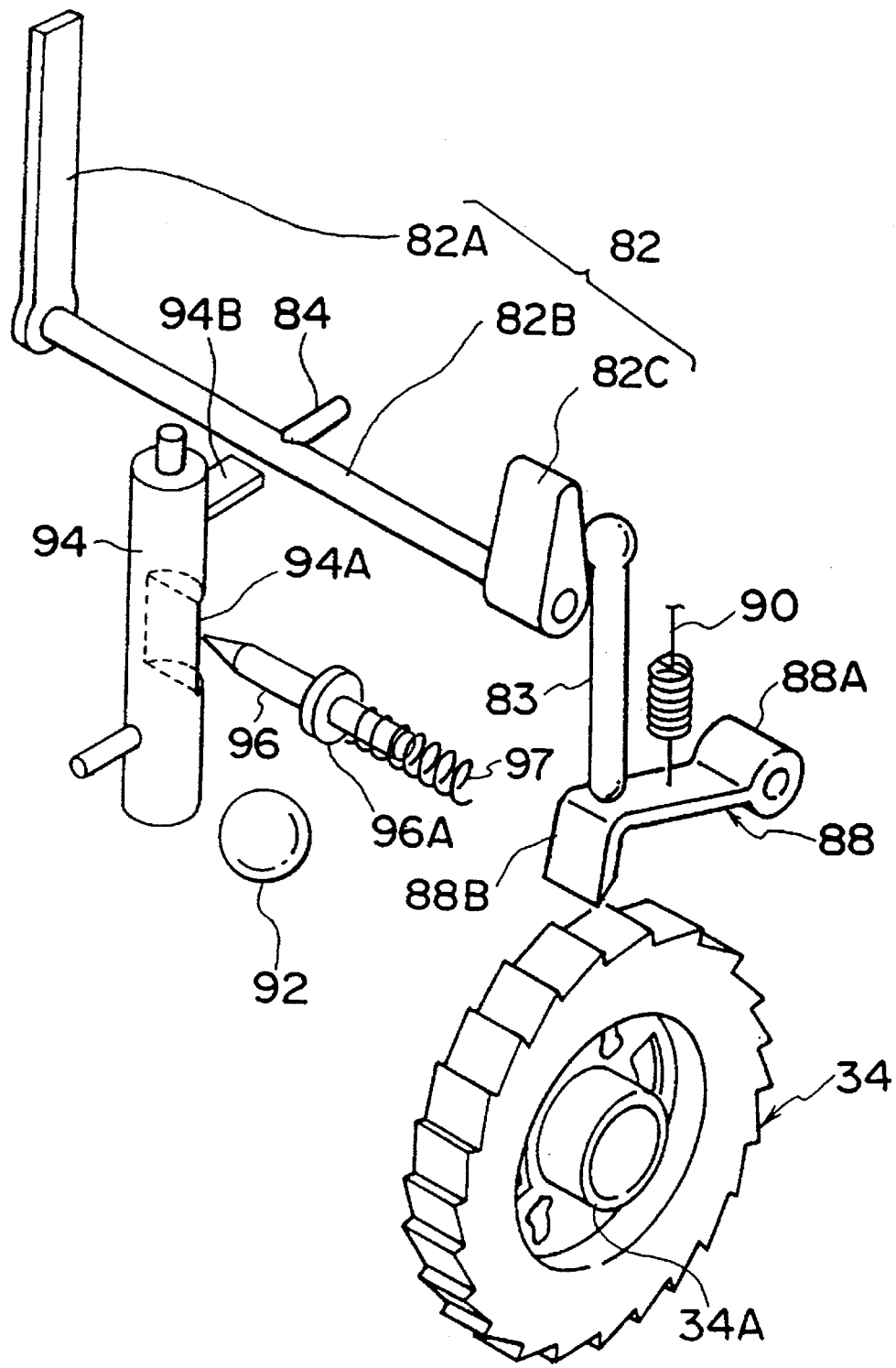
FIG. 5 is an exploded perspective view illustrating the preload mechanism of FIG. 1 set in an actuatable state by the preload control mechanism thereof.
Figure 6:
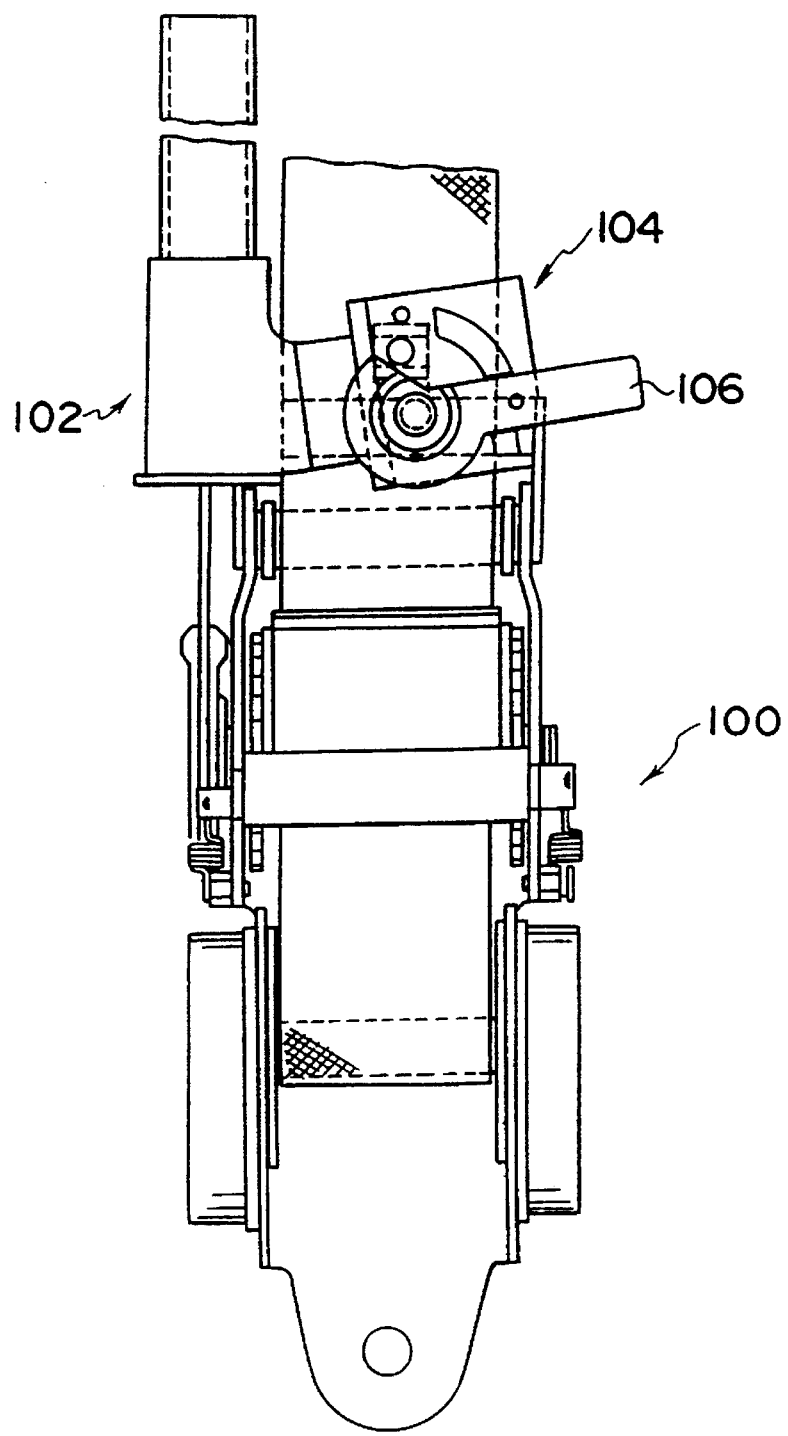
FIG. 6 is a front view showing a webbing retractor provided with a preloader employed in a conventional example.
Figure 7:
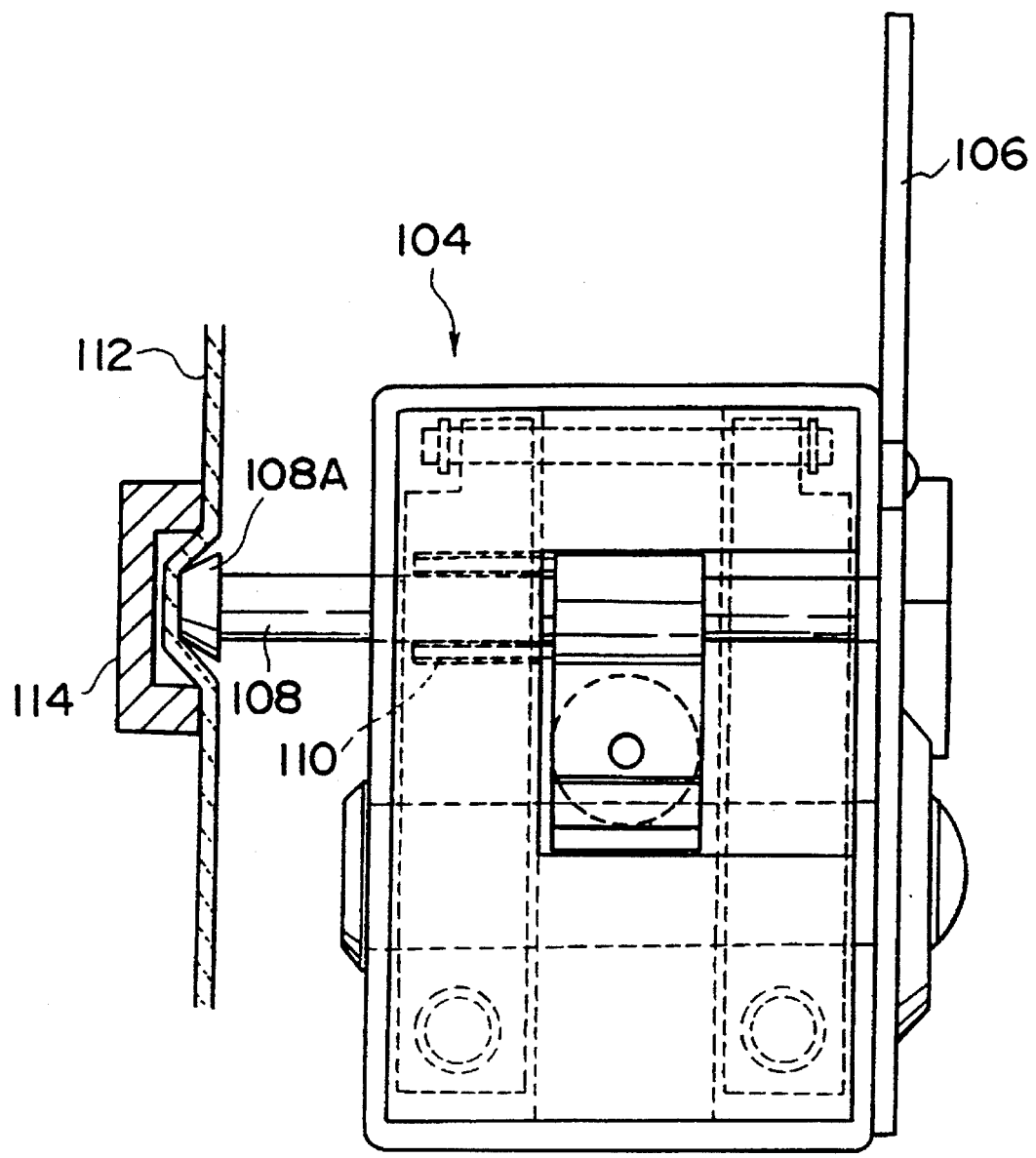
FIG. 7 is an enlarged plan view showing a part of FIG. 6 illustrating the webbing retractor equipped with the preloader employed in the conventional example.

As shown in FIGS. 4 and 5, the sensor held within the sensor holder 80 has a ball 92 which moves inertially when the vehicle suddenly decelerates, a drive shaft 94 which swings about an axis 93 due to the inertial movement of the ball 92, and a bias spring 95 pressed against the ball 92 via the drive shaft 94 and urged in the direction opposite to the direction of inertial movement of the ball 92. The drive shaft 94 has a cut-out portion 94A which is held in engagement with a large-diameter portion 96A of an ignition pin 96. When the drive shaft 94 is swung a predetermined amount, the large-diameter portion 96A is released from engagement and is moved by the urging force of a spring 97. As a result, the ignition pin 96 strikes against a detonator 98 so as to ignite it. After the detonator 98 has been ignited, the gas generating materials are burnt so as to produce gas. As a result, the piston is forced up toward the tip end of the cylinder 78.

As shown in FIG. 1, a safety device 81 is disposed at the sensor holder 80. The safety device 81 basically includes an operation unit 82 operated by an operator, a pressing member 83 moved upward and downward due to operation of the operation unit 82, and a pawl lever 88 (see FIGS. 4 and 5) for the safety device 81, which is swung by the pressing member 83. Further, the operation unit 82 has a lever 82A disposed at an outerside of one side surface of the sensor holder 80, a support shaft 82B extending in a direction orthogonal to the surface of the lever 82A from one end of the lever 82A, and a cam member 82C fixed to a leading end portion of the support shaft 82B and disposed at an outerside of the other side surface opposite to the one side surface of the sensor holder 80.

As illustrated in FIGS. 4 and 5, an arm 84 is formed so as to project from a portion of the peripheral surface of the support shaft 82B. When the safety device 81 is operated, i.e., in the state shown in FIG. 4, the arm 84 is located at a position where it interferes with a locus of swinging movement of an arm 94B which protrudes from the drive shaft 94 so as to block the swinging movement of the drive shaft 94. However, when the safety device 81 is in a non-operating state, i.e., in the state shown in FIG. 5, the arm 84 is moved to a position where it does not interfere with the locus of the swinging movement of the arm 94B, thereby making it possible to actuate the preloader 52.

The pressing member 83 shaped in the form of a shaft is provided at a position where it interferes with a locus of rotation of the cam member 82C. A base end portion of the pressing member 83 is spherical and is held in contact with a concave portion (see FIG. 4) defined in a lower end surface of the cam member 82C. When the cam member 82C is rotated in a clockwise direction about the support shaft 82B in the state shown in FIG. 5, the lower end surface of the cam member 82C pushes down the base end portion of the pressing member 83. On the other hand, when the cam member 82C is rotated in a counterclockwise direction about the support shaft 82B from the state illustrated in FIG. 4, the pressing member 83 is pulled upward by the urging force of a tension coil spring 90 to be described later. When the pressing member 83 is moved upward and downward, it is guided by a guide member 86 formed at an upper end portion of the sensor cover 50 as shown in FIG. 1. The leading end of the pressing member 83 is brought into contact with the upper surface of the intermediate portion of the pawl lever 88.

The pawl lever 88 is disposed above the lock wheel 34 and has a base portion 88A supported by the leg plate 12. A tip portion 88B of the pawl lever 88 is bent toward the teeth of the lock wheel 34 and is engageable with the teeth. Further, one end of the torsion coil spring 90 is maintained in engagement with the pawl lever 88. The other end of the torsion coil spring 90 is held in engagement with the leg plate 12. Thus, the torsion coil spring 90 urges the pawl lever 88 to be pulled out in a direction (i.e., the direction indicated by arrow C in FIG. 4) of moving away from the teeth of the lock wheel 34.

Thus, when the lever 82A is held in a substantially horizontal state as shown in FIG. 4, the cam member 82C is also brought into a substantially horizontal state. As a result, the leading end of the pressing member 83 pushes down the pawl lever 88 so that the pawl lever 88 engages a tooth of the lock wheel 34. This state corresponds to the operating state of the safety device 81. In this state, the arm 84 of the support shaft 82B prevents the drive shaft 94 from swinging and the lock wheel 34 is prevented from being rotated in the webbing pulling-out direction. Thus, the webbing 18 cannot be pulled out from the webbing retractor 10.

On the other hand, when the lever 82A of the operation unit 82 is maintained in a substantially vertical state as illustrated in FIG. 5, the cam member 82C is also brought into a substantially vertical state. Thus, the cam member 82C is moved away from the pressing member 83 so that no pressing force is applied to the pawl lever 88. As a result, the tip portion 88B of the pawl lever 88 separates from the teeth of the lock wheel 34. This state corresponds to the non-operating state of the safety device 81. In this state, the arm 84 of the support shaft 82B enables the drive shaft 94 to swing and the lock wheel 34 is not prevented from being rotated in the webbing pulling-out direction. Therefore, the webbing 18 can be pulled out from the webbing retractor 10.

Operation of the present embodiment will be described below.

An operator first mounts the webbing retractor 10 to a lower portion of a side wall of a vehicle body. At this time, the lever 82A of the operation unit 82 is maintained at a substantially horizontal position (the state shown in FIG. 4). Therefore, the arm 84 of the support shaft 82B prevents the drive shaft 94 from swinging and the leading end of the pressing member 83 pushes down the pawl lever 88. Thus, the tip portion 88B of the pawl lever 88 is held in engagement with a tooth of the lock wheel 34 and hence the lock wheel 34 is prevented from being rotated in the webbing pulling-out direction. Therefore, even if the operator desires to pull out the webbing 18 to wind it on a slip joint or the like, the webbing 18 cannot be pulled out. As a result, the operator notes that the safety device 81 of the preloader 52 is operated. Since the lock wheel 34 forming a portion of a locking means is prevented from being rotated in the webbing pulling-out direction even if the operator attempts to forcibly pull out the webbing 18, the webbing 18 cannot be pulled out.

When the operator rotates the lever 82A of the operation unit 82 until the lever 82A is brought into the vertical state after the assembling of the webbing retractor 10 to the vehicle body has been completed, the arm 84 of the support shaft 82B and the cam member 82C are rotated correspondingly to enable the drive shaft 94 to swing and to move the pressing member 83 upward. Therefore, the pawl lever 88 is pulled upward by the urging force of the torsion coil spring 90 so that the pawl lever 88 is released from engagement with the lock wheel 34, that is, the safety device 81 is released from the operating state. Thus, the operator can pull out the webbing 18 and the pulled out webbing 18 is inserted through the slip joint and a tongue plate and is thereafter fixed to the vehicle body by an anchor plate.

When the vehicle suddenly decelerates after the webbing 18 has been applied to an occupant, the ball 92 in the sensor of the preloader 52 is inertially moved so as to swing the drive shaft 94 against the urging force of the bias spring 95. Therefore, the ignition pin 96 is moved by the urging force to ignite the detonator 98. Accordingly, the unillustrated booster and the gas generating materials successively combust so as to produce gas. As a result, the piston is forced upward so as to wind and tighten the wire 74.

Accordingly, the shear pins 68 and 70 respectively supporting the pair of wedge type members 62 and 64 are first sheared so that the wedge type members 62 and 64 are moved deeper into the ring groove 60 so as to contact the peripheral surface of the axial central portion of the rotating drum 54. The shear pin 72 is then sheared so that the remaining wedge type member 66 moves deeper into the ring groove 60 so as to contact the peripheral surface of the axial central portion of the rotating drum 54. As a result, the rotating drum 54 is pulled by the wire 74 so as to be rapidly rotated integrally with the wedge type members 62, 64 and 66 in the webbing winding direction. Thus, the take-up shaft 20 is also rotated rapidly in the same direction so as to wind the webbing 18 a predetermined amount to thereby tightly apply the webbing 18 to the occupant.

The ball 48 rolls due to the inertial force produced when the vehicle suddenly decelerates to thereby push up the pawl lever 44. Therefore, the lock wheel 34 is prevented from being rotated in the webbing pulling-out direction. Thus, when the occupant is slightly moved inertially toward the front of the vehicle such that the webbing 18 is drawn out, relative rotation is generated between the take-up shaft 20 and the lock wheel 34 so that the pair of lock plates 22 and 24 move relative to each other. Accordingly, the pawls 22A and 24A of the lock plates 22 and 24 are held in engagement with the lock teeth 28A of the internal gear wheel 28 so that the take-up shaft 20 is prevented from being rotated in the webbing pulling-out direction. As a result, the webbing 18 is prevented from moving in the webbing pulling-out direction so that the occupant is securely restrained by the webbing 18.

When the webbing retractor 10 is removed from the vehicle, the lever 82A of the operation unit 82 is rotated from the vertical state (the state shown in FIG. 5) to the horizontal state (the state shown in FIG. 4). Therefore, the arm 84 of the support shaft 82B is rotated so as to prevent the drive shaft 94 from swinging so as to push down the pressing member 83. Thus, the pawl lever 88 for the safety device 81 is pushed down against the urging force of the torsion coil spring 90 so as to be held in engagement with a tooth of the lock wheel 34. As a result, the operator can safely and reliably remove the webbing retractor 10 from the lower portion of the side wall of the vehicle body.

In the present embodiment as described above, the lever 82A of the safety device 81 of the preloader 52 employed in the webbing retractor 10 forcibly prevents the lock wheel 34 from being rotated in the webbing pulling-out direction. It is therefore possible to prevent beforehand the operator from forgetting to deactuate the safety device 81 of the preloader 52. Further, the webbing 18 can be reliably prevented from being moved in the webbing pulling-out direction as compared with the conventional structure in which the webbing is clamped.

The present embodiment has shown a structure in which the tip portion 88B of the pawl lever 88 is held in engagement with a tooth of the lock wheel 34. However, the present invention is not necessarily limited to this structure. As long as a structure is used wherein the tip portion 88B engages with one element of the locking means of the webbing retractor 10, the present invention can be applied to any other structure. For example, the pawl lever 44 of the acceleration sensor 42 may be restrained from swinging.

Having now fully described the invention, it will be apparent to those skilled in the art that many changes and modifications can be made without departing from the spirit or scope of the invention as set forth herein.

What is claimed is:

1. A preloader used in a webbing retractor comprising:

a take-up shaft for winding an occupant-restraining webbing thereon in layer form locking means for preventing said take-up shaft from being rotated in a webbing pulling-out direction in an emergency of a vehicle, and a load mechanism for rapidly and instantaneously rotating said take-up shaft in a webbing winding direction when the vehicle suddenly decelerates including:

a preloader control mechanism operated by an input so as to switch from a first state in which said load mechanism is inoperable when the vehicle suddenly decelerates to a second state in which said load mechanism is operable; and interlocking means which interlocks with said preloader control mechanism to lock said locking means in a first state in which said preloader control mechanism is inoperable when said preloader control mechanism is switched into said first state so as to prevent said take-up shaft from being rotated in the webbing pulling-out direction, and to unlock said locking means into a second state in which said preloader control mechanism is operable when said preloader control mechanism is switched into said second state so as to enable said take-up shaft to be rotated in the webbing pulling-out direction.

2. A preloader according to claim 1, wherein said preloader control mechanism has a lever which is manually operated so as to switch said load mechanism from said first state to said second state.

3. A preloader according to claim 1, wherein said interlocking means enables said locking means to be placed in a simulated locked state similar to a state in which said locking means is actuated in response to a vehicle acceleration.

4. A preloader according to claim 1, wherein said locking means includes a lock wheel and lock plates rotatable with said take-up shaft, and is actuated in response to vehicle acceleration so as to delay rotation of said lock wheel with respect to said take-up shaft so that said lock wheel engages a fixed lock member to prevent said take-up shaft from rotating, and said interlocking means contacts said lock wheel so as to delay rotation of said lock wheel.

5. A preloader according to claim 1, wherein said locking means prevents said take-up shaft from rotating due to relative rotation of a lock wheel to said take-up shaft, and said interlocking means rotates said lock wheel relative to said take-up shaft so as to lock said locking means.

6. A preloader according to claim 5, wherein said interlocking means has a portion which engages with said lock wheel.

7. A preloader according to claim 5, wherein said locking means enables a pawl lever to engage said lock wheel in an emergency of the vehicle so as to rotate said lock wheel relative to said take-up shaft, and said interlocking means enables said pawl lever to forcibly engage said lock wheel.

8. A retractor having an occupant-restraining webbing, comprising:

a take-up shaft for winding said webbing thereon;

acceleration responding means responsive to a vehicle acceleration so as to prevent said take-up shaft from being rotated in a webbing pulling-out direction;

a preloader for rapidly rotating said take-up shaft in a webbing winding direction in an emergency of a vehicle; and controlling means capable of selecting one of a first state in which said preloader is made unable to rotate in the webbing winding direction and said acceleration responding means prevents said take-up shaft from being rotated in the webbing pulling-out direction and a second state in which said preloader is made able to rotate in the webbing winding direction and said acceleration responding means enables said take-up shaft to be rotated in the webbing pulling-out direction.

9. A retractor according to claim 8, wherein said acceleration responding means has a lock wheel and lock plates rotatable with said take-up shaft, and engages said lock plates with a fixed lock member when rotation of said lock wheel with respect to said take-up shaft is delayed.

10. A retractor according to claim 8, wherein said interlocking means has a switching lever which is manually operated so as to switch said preloader from a state in which said preloader is unable to rotate in the webbing winding direction to a state in which said preloader is able to rotate in the webbing winding direction.

11. A retractor according to claim 8, wherein said acceleration responding means corresponds to one axial-direction end of said take-up shaft, said preloader corresponds to another axial-direction end of said take-up shaft and an interlocking means is provided so as to connect said acceleration responding means and said preloader.

12. A retractor according to claim 11, wherein said interlocking means is disposed along an axial direction of said take-up shaft.

13. A retractor according to claim 8, wherein said acceleration responding means has a lock wheel which is rotated together with said take-up shaft and which locks rotation of said take-up shaft in the webbing pulling-out direction when rotation of said lock wheel with respect to said take-up shaft is delayed.

14. A retractor according to claim 13, wherein said controlling means applies rotational resistance to said lock wheel.

15. A retractor according to claim 14, wherein said acceleration responding means has an inertia responding member for applying the rotational resistance to said lock wheel at a vehicle acceleration of a predetermined value or more.

16. A retractor according to claim 13, wherein said controlling means applies rotational resistance to said lock wheel.

17. A retractor according to claim 13, wherein said controlling means has a pawl which engages with said lock wheel.

18. A webbing retractor having a webbing for restraining an occupant in an emergency of a vehicle comprising:

a frame;

a webbing take-up shaft mounted on said frame;

a lock wheel supported on one end of said webbing take-up shaft by a predetermined urging force and rotated so as to follow up said webbing take-up shaft;

locking means for delaying rotation of said lock wheel with respect to said webbing take-up shaft to prevent said webbing take-up shaft from being rotated in a webbing pulling-out direction;

acceleration responding means for applying rotational resistance to said lock wheel when a vehicle acceleration becomes large;

a preloader disposed so as to correspond to another end of said webbing take-up shaft and forcibly rotating said webbing take-up shaft in a webbing winding direction upon application of a predetermined acceleration; and controlling means which is manually operated so as to switch from a state in which said preloader is made inoperable and the rotational resistance is applied to said lock wheel to a state in which said preloader is made operable and application of the rotational resistance to said lock wheel is not applied.

19. A retractor according to claim 18, wherein said controlling means has connecting means for providing a mechanical connection between said acceleration responding means and said preloader.

20. A retractor according to claim 18, wherein said controlling means has connecting means which provides a mechanical connection between said acceleration responding means and said preloader, and which engages with said lock wheel.

* * * * *